July 14, 1953  D. LABINO ET AL  2,645,749
LIQUID LEVEL MOTOR CONTROL SYSTEM
Filed Sept. 4, 1948  2 Sheets-Sheet 1

Inventors
DOMINICK LABINO
VERNEY G. POLITSCH

By Rule and Hoge
Attorneys

Patented July 14, 1953

2,645,749

UNITED STATES PATENT OFFICE 2,645,749

LIQUID LEVEL MOTOR CONTROL SYSTEM

Dominick Labino, Maumee, Ohio, and Verney G. Politsch, Alton, Ill., assignors to Owens-Illinois Glass Company, a corporation of Ohio Application September 4, 1948, Serial No. 47,888

4 Claims. (Cl. 318—102)

Our invention relates to apparatus for maintaining molten glass or other liquids at a substantially constant level or at a level within prescribed limits, together with means for indicating such level and signaling any deviation therefrom.

The invention in its preferred form provides an apparatus for maintaining the level of molten glass in a continuous furnace tank substantially constant or within prescribed operating limits. In a glass furnace of this type, the molten glass is drawn from the tank substantially continuously and in order to maintain the supply of glass in the tank at a working level, the raw glass forming materials are fed into the melting compartment continuously or at intervals by a batch feeder or feeders. An object of the invention is to provide automatic control means for controlling the operation of the batch feeder motors in a manner to supply the batch at a rate corresponding to that at which the melted and refined glass is withdrawn from the refining tank.

A further object of the invention is to provide novel and practical means for indicating and recording the level of the glass over a given time, for example, a number of hours or a day.

Other objects of the invention will appear hereinafter.

Referring to the accompanying drawings.

Figure 1:
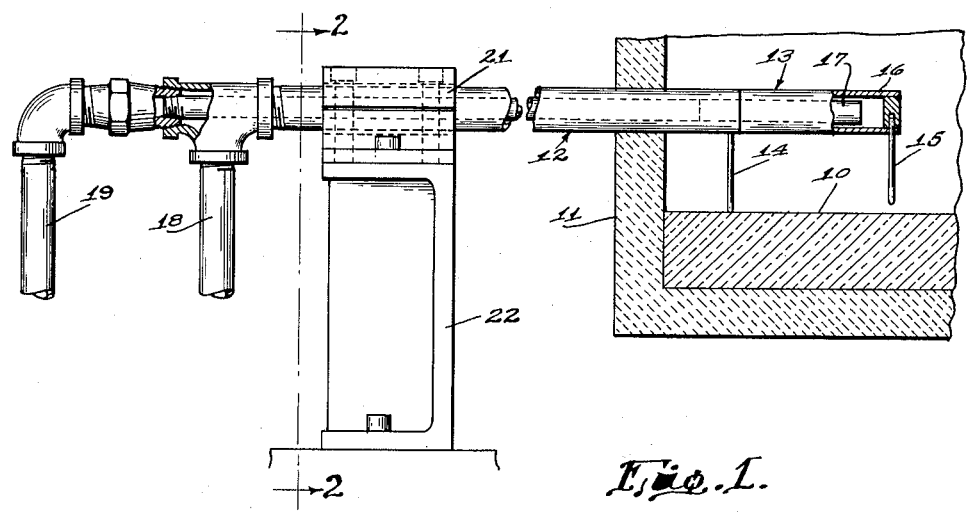
Fig. 1 is a side elevation with parts broken away and parts in section, showing the probes and their relation to the glass.
Figure 2:
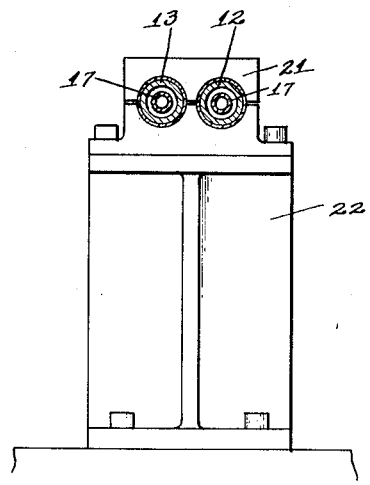
Fig. 2 is a sectional elevation at the line 2—2 on Fig. 1.

As herein illustrated and described, the invention is particularly adapted for use in maintaining the level of molten glass 10 in a furnace tank 11, but may have a more general application, being adaptable for maintaining the level of molten metals or other liquids. The apparatus comprises a pair of probes 12 and 13 mounted side by side and projecting into the furnace tank. Feelers 14 and 15, preferably consisting of platinum wires, are attached to the probes 12 and 13 respectively. The feelers 14 and 15 are adapted to contact the molten glass and function as electrodes in a manner hereinafter described. The electrode 14, herein referred to as the long electrode, is of a length to contact the surface of the glass when the latter is at a normal working level. The electrode 15, referred to as the short electrode, terminates a short distance, for example, an eighth of an inch, above the normal glass level.

To permit water cooling of the probes 12 and 13, each probe comprises an outer tube or pipe 16, closed at its forward end, and an inner tube 17. Water or other cooling fluid is supplied through a pipe 18 connected to the tube 16, so that the coolant flows forward through the outer tube 16 and is returned through the inner tube 17 to a discharge pipe 19. The probes are clamped in a split bearing block 21 mounted on a standard 22.

Figure 3:
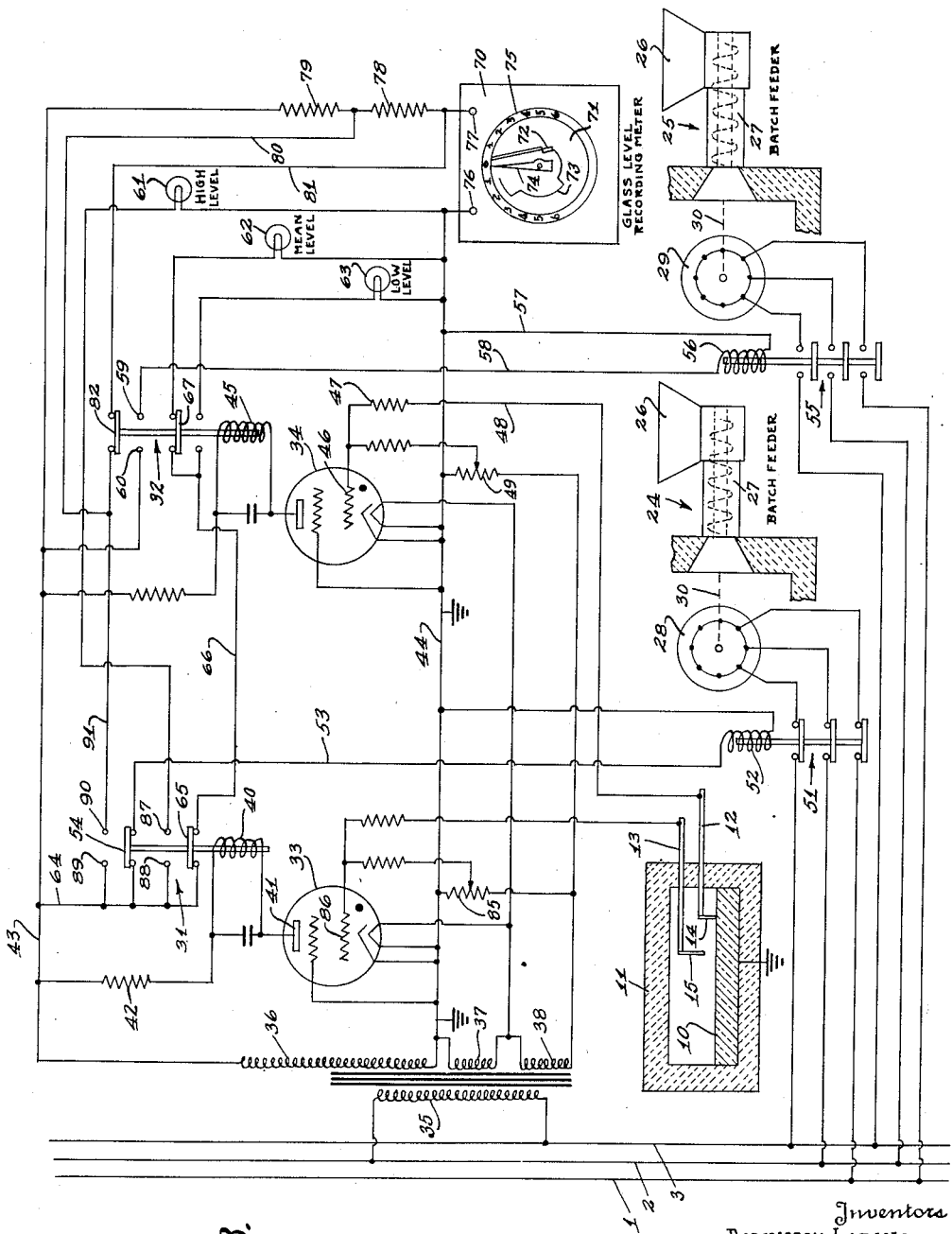
Fig. 3 is a wiring diagram of the apparatus.

The glass forming materials are fed to the furnace tank by one or more batch feeders. As shown diagrammatically in Fig. 3, two batch feeders 24 and 25 are employed. Each feeder comprises a hopper 26 and a power driven element 27, in the form of a screw propeller, by which the materials are fed into the tank. The feeders 24 and 25 are driven by electric motors 28 and 29 respectively, having driving connections 30 with the propellers 27. The motors receive power from the mains 1, 2 and 3 of a three-phase alternating current system. The motors 28 and 29 are under the control of relays 31 and 32 respectively. The operations of the relays are controlled by electron tubes 33 and 34, herein shown as gas-filled tubes.

The current for actuating the electron tubes, relays and other indicating and control devices is supplied through an iron core transformer comprising a primary coil 35 connected across the mains 2 and 3, and secondary coils 36, 37 and 38. The electromagnet coil 40 of the relay 31 is connected in the plate circuit of the tube 33, said circuit extending from the plate 41 through coil 40, resistance 42 and wire 43 to one end of the transformer coil 36, the other end of which is connected to the ground wire 44.

When the glass 10 is at a normal working level, with the electrode 15 out of contact therewith, the plate circuit of the tube 33 is open and the coil 40 deenergized so that the relay 31 is dropped to the position shown. The relay 32 has its magnet coil 45 in the plate circuit of the electron tube 34, the relay being as shown, in the position assumed when the tube is fired and the coil 45 energized. The glass in the tank is grounded as shown, so that when the electrode 14 is in contact with the glass, the grid 46 is grounded through a resistance 47 and wire 48 extending to the probe 12. This short circuits the resistance 49 connected between the ground wire 44 and the grid and lowers the potential of the grid to a point at which the tube is fired and energizes the relay coil 45.

While the level of the glass is normal, the parts are in the positions indicated in the diagram. The batch feeder 24 operates continuously while the glass maintains a working level, being designed to supply batch material to the furnace at substantially the rate at which the refined glass is withdrawn from the furnace. The switch 51, in circuit with the batch feeder motor 28, is held in closed position by its magnet coil 52 in a circuit extending from the transformer coil 36, through ground wire 44, coil 52, wire 53, and contact bar 54 of the relay 31.

The second batch feeder 25 remains stationary while the glass level is normal, as the switch 55 in circuit with the motor 29 is open. The magnet coil 56 is in a circuit extending from the ground wire 44 through wire 57, coil 56, wire 58, and open at the contacts 59, 60 of the relay 32.

Signal devices may be used to give signals when the glass rises above or falls below the normal working level. As herein shown, electric lamps 61, 62 and 63 serve to indicate high, normal and low levels respectively. These lamps are connected in circuits across the transformer coil 36. The lamp 62 is connected in circuit extending from coil 36 through wire 43, wire 64, relay contact bar 65, wire 66, contact bar 67 and lamp 62 to ground wire 44. Lamp 62 therefore remains lighted while the glass is at a normal level.

The glass level is indicated and recorded by a recording meter 70 which may be a voltage recorder of known construction. The recorder comprises a recording disc 71 which is rotated by clockwork, a stylus 72 which marks a record 73 on the disc, and a pointer 74 which indicates on a graduated scale 75 the level of the glass. The recorder is actuated by a voltage impressed across terminals 76 and 77. Resistances 78 and 79 reduce the voltage drop through the recorder. When the parts are in the position shown, the resistance 78 is short circuited by wires 80 and 81 and contact bar 82 of the relay 32. Resistance 79 is in a circuit extending from the secondary coil 36 through wire 43, resistance 79, wire 80, contact bar 82 and wire 81 to the terminal 77, terminal 76 being connected to the ground wire 44. With the resistance 79 thus in the circuit, the pointer 74 and stylus 72 are held in the intermediate positions indicating a normal glass level.

When the glass level falls below normal, the electrode 14 is separated from the glass with the following results. The ground circuit through the electrode and wire 48 is broken, opening the short circuit across the resistance 49 in circuit with the grid 46 so that the plate circuit through the tube 34 is opened and the magnet coil 45 de-energized. This permits the contact bars 67 and 82 to drop. The contact bar 67 thereby opens the circuit to the lamp 62 and closes the circuit for the low level lamp 63. This latter circuit extends from the ground wire 44 through the lamp 63, contact bar 67, wire 66, contact bar 65 and wires 64, 43. Lamp 63 is thus lighted, indicating a sub-normal level of the glass.

The contact bar 82 when lowered as just described, opens the short circuit across the resistance 78, thereby throwing said resistance, in series with the resistance 79, into the circuit of the recording meter, so that the latter indicates and records the low level of the glass. When the contact bar 82 drops, it also bridges contacts 59 and 60, thus establishing a circuit for the magnet coil 56 so that the latter operates to close the switch 55. The motor 29, being thus energized, starts the batch feeder 25 so that both feeders are in operation, and the rate at which the batch is fed to the furnace is thereby increased, tending to raise the level of the glass. When the glass again contacts the electrode 14, the electron tube 34 is again energized and the parts restored to the position shown, indicating normal glass level.

When the level rises above normal so that the electrode 15 is grounded through the glass, the resistance 85 in circuit with the grid 86 is short-circuited so that the tube 33 is fired, energizing the coil 40 so that the relay 31 operates to lift its contact bars. The contact bar 65 when lifted, breaks the circuit through the mean level lamp 62. The bar 65 also bridges the contacts 87, 88 thereby completing a circuit through the high level lamp 61 which then gives a high level signal.

When the contact bar 54 is lifted, it bridges contacts 89 and 90, thereby short-circuiting the resistances 78, 79 in the recorder, the short circuit being via wire 91, contact bar 82 and wire 81. The recorder meter, therefore, indicates and records the high glass level. The lifting of the contact bar 54 also opens the circuit extending through wire 53 and magnet coil 52 so that the switch 51 is opened, thereby stopping the motor 28 and the batch feeder 24. Both batch feeders are now at rest and remain so until the glass level is again lowered sufficiently to break contact with the electrode 15. This results in opening the plate circuit of the tube 33 so that the relay 31 drops its contact bars, restoring the parts to normal glass level positions.

Although two batch feeders with their motors are herein disclosed, a single batch feeder might be used, driven by a variable speed motor, the speed of the motor being under the control of the electron tubes 33, 34, operating through relays in the control circuits of the motor to vary the speed in response to variations in the glass level, thereby maintaining a normal working level.

Modifications may be resorted to within the spirit and scope of our invention.

We claim:

1. An electric motor control system comprising a pair of contact elements mounted over a body of liquid, one said element being in contact with the liquid when the latter is at a predetermined normal level and out of contact when the level falls below normal, the other contact element being out of contact with the liquid at said normal level and in contact with the liquid when the latter rises above said normal, electron tubes individual to said contact elements, control circuits for the tubes, each circuit including one said element, the liquid and a resistance interposed between each said element and the liquid, each said resistance being short-circuited when the respective element is in contact with the liquid, thereby firing the respective tube, relays individual to the tubes, each comprising an operating coil in the plate circuit of the tube, electrical motors, motor switches individual to the motors, control circuits for the respective motors including switches actuated by said relays, each said circuit being energized when the respective tube is fired.

2. A motor control system comprising a pair of stationary contact elements, one said element being in position to contact a body of liquid when the liquid is at a predetermined normal level, the other contact element being spaced above the liquid at said level, a source of electric current supply, two electric motors, electro-responsive means individual to each said motor for connecting the motors to the said source of current supplies and causing the operation of each said motors, a control circuit for each said electro-responsive means, said circuits extending from said source of current supply, said electro-responsive means being actuated, when its respective control circuit is completed, to arrest the operation of the respective motor, each said control circuit including the liquid and one of the elements, whereby one circuit is completed when one element is in contact with the liquid and the other circuit is completed when the other element is in contact with the liquid, and each said circuit is broken when its element is out of contact with the liquid, said electro-responsive means being thereby actuated to cause the concurrent operation of both motors when the level of the liquid is lowered to a point at which both said contact elements are out of contact therewith, to arrest the operation of both motors when both the said elements are in contact with the liquid, and to maintain one said motor in operation and the other at rest when only one said element is in contact with the liquid.

3. A motor control system comprising electric contact elements mounted over a body of liquid, one said element extending downward into position to contact the liquid when the latter is at a predetermined normal level, the other contact element being spaced above the liquid at said level, electric motors, switches individual to said motors and controlling their operation, relays individual to said switches and controlling the operation of the switches, electron tubes individual to said relays, plate circuits for said tubes, each said relay comprising a coil in the plate circuit of its respective tube, a grid circuit for each tube comprising one of the contact elements and the liquid, each said grid circuit being completed when its said contact element is in contact with the liquid, the completion of each grid circuit thereby effecting the operation of the tube and energizing the relay, said relay in turn, actuating the switch to arrest the operation of the respective motor.

4. In an electric motor control system, the combination of electrical contact elements having a stationary mounting in a predetermined position over a body of liquid, one of said elements being in contact with the liquid when the latter is at a predetermined normal level and out of contact with the liquid when the level is below normal, the other contact element being out of contact with the liquid at said normal level and in contact with the liquid when the level rises above normal, a source of electric current, thyratrons individual to said contact elements, plate circuits for the thyratrons connecting them to said source of current, the thyratrons having control grids connected in circuit with said contact elements respectively, said liquid being grounded so that each grid is grounded when it contacts the liquid and thereby fires its tube, electromagnet coils in the plate circuits of the thyratrons, electric motors, means providing motor circuits connecting the motors to a source of current supply and including motor control switches in said motor circuits, secondary circuits individual to the motor control switches and connected to the source of current supply, electromagnet coils in said secondary circuits for operating said switches, relay contact bars in the secondary circuits, electromagnet coils in the plate circuits of the thyratrons for operating the relay contact bars and completing the secondary circuits so that the electromagnet coils in the secondary circuits actuate the motor control switches and thereby establish a circuit for one motor when the lower contact element contacts the liquid while the other contact element is out of contact with the liquid, establish circuits for both motors when both said elements are out of contact with the liquid and open the circuits for both motors when both said elements are in contact with the liquid.

DOMINICK LABINO.
VERNEY G. POLITSCH.

References Cited in the file of this patent
UNITED STATES PATENTS

| Number | Name | Date |
|---|---|---|
| 1,961,893 | Wadman et al. | June 5, 1934 |
| 2,042,169 | Cook | May 26, 1936 |
| 2,177,083 | Sykes et al. | Oct. 24, 1939 |
| 2,334,988 | Bonner | Nov. 23, 1943 |
| 2,380,436 | Holdman | July 31, 1945 |
| 2,394,220 | Wagner | Feb. 5, 1946 |
| 2,428,126 | Nicholson, Jr. | Sept. 30, 1947 |
| 2,534,801 | Siltamaki | Dec. 19, 1950 |
| 2,534,958 | Deming | Dec. 19, 1950 |
| 2,560,639 | Giesler et al. | July 17, 1951 |